Oct. 17, 1939.    H. NERWIN    2,176,679
PHOTOGRAPHIC CAMERA
Filed Jan. 29, 1938
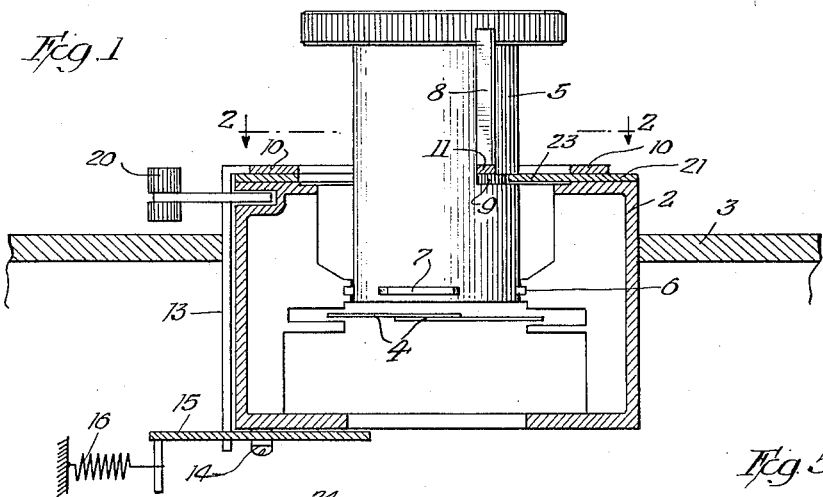
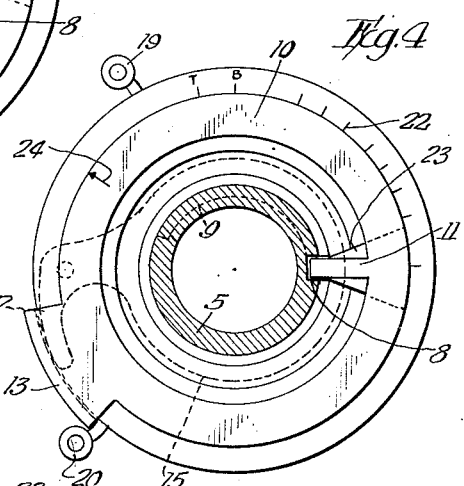
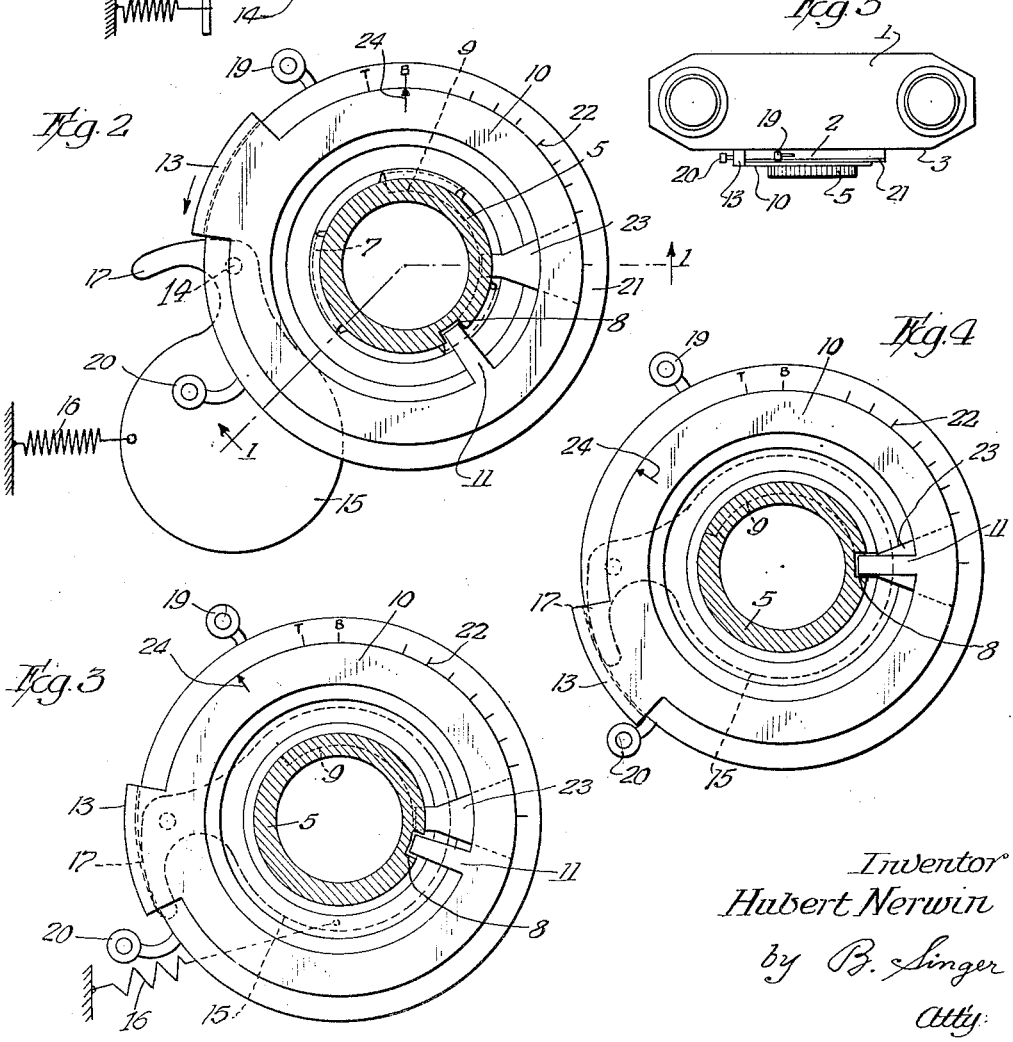
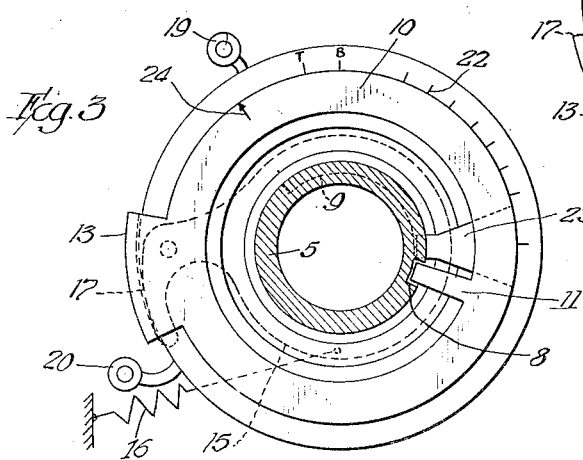
Inventor
Hubert Nerwin
by B. Singer
Atty Patented Oct. 17, 1939

2,176,679

UNITED STATES PATENT OFFICE 2,176,679

PHOTOGRAPHIC CAMERA

Hubert Nerwin, Dresden, Germany, assignor to Zeiss Ikon Aktiengesellschaft, Dresden, Germany Application January 29, 1938, Serial No. 187,629
In Germany February 26, 1937

10 Claims. (Cl. 95—39)

The invention relates to improvements in photographic cameras.

The principal object of the invention is a photographic camera having a camera objective which is axially pushed into the camera and through the previously opened shutter when it is desired to fold the camera into a compact form when not in use.

Another object of the invention is to provide a camera of the above type with an auxiliary shutter, which is normally open and is closed when the main shutter is opened for permitting the camera objective to be pushed therethrough. The auxiliary shutter prevents an exposure of the light sensitive layer which may be arranged in the focal plane of the camera objective, as it is the case particularly in rollfilm cameras.

It is also an object of the invention to provide means for positively moving said auxiliary shutter into closed position prior to moving the main shutter into open position in response to any action resulting in an adjustment of the camera objective preparatory to pushing the same into the camera.

Another object of the invention is to provide an auxiliary shutter comprising a plate rockably mounted on the main shutter casing and having a projection of arcuate form concentric with the axis of rotation of said plate, said projection normally projecting into the path of a control member which may be arranged concentrically about the objective barrel, said plate being held by the control member in closed position against the action of a spring by engagement of the control member with the projection. In order to prevent a premature pushing-in of the camera objective, the control member is provided with a projection engaging a longitudinal groove in the objective barrel and the customary shutter speed adjusting ring of the main shutter has a lug engaging a circumferential groove in the objective barrel which groove is connected with said longitudinal groove, so that upon adjustment of the shutter speed to bulb and rotation of the objective barrel out of its bayonet joint with the shutter casing the projection and the lug are both in the longitudinal groove. In order to assure an opening of the main shutter only after closing of the auxiliary shutter the projection of the auxiliary shutter engaged by the control member is preferably located adjacent the release lever of the main shutter, so that the release lever is engaged by the control member after rocking the auxiliary shutter into closed position and is moved to release position towards the end of the movement of said control member in auxiliary shutter closing direction.

Other objects of the invention will be apparent from the following description of a simple embodiment of the invention with reference to the accompanying drawing:

The invention, however, is not limited to the embodiment herein described, as various other forms may be adopted within the scope of the claims.

In the drawing:

Fig. 1 illustrates diagrammatically and in section along the broken line 1—1 of Fig. 2 a shutter assembly of a camera associated with an axially shiftable camera objective, the latter being shown in extended position.

Fig. 2 is a horizontal section along the line 2—2 of Fig. 1 with the camera objective in extended or operative position.

Figs. 3 and 4 are similar views as Fig. 2 but shows the parts in different operative positions with respect to each other, and Fig. 5 illustrates in a top plan view and in a reduced scale a rollfilm camera provided with the invention, the camera objective being shown in a pushed-in or inoperative position.

Referring to the drawing, a casing 2 containing the shutter mechanism is attached to the front wall 3 of the camera casing 1 and extends with its larger portion into the same. The movable shutter leaves which control the exposure time are indicated at 4. The shutter casing 2 is provided with a central bore into which the barrel 5 of the photographic lens system is inserted and secured therein detachably by a bayonet joint indicated at 6. The barrel 5 is provided with radial projections 7 adapted to enter into locking engagement with the slots of said bayonet joint.

The shutter may be of conventional construction and is equipped with a tensioning lever 19, a release lever 20 and a speed adjusting ring 21 provided with a shutter speed scale 22. The other details of the shutter are not illustrated, because they are conventional and are not necessary for an understanding of the invention.

The barrel 5 of the lens system is provided on its outer circumference with a lengthwise extending groove 8, one end of which is connected with a transverse or circumferential groove 9 which extends about 180° around the barrel 5 as indicated in Fig. 2.

A control ring 10 is rotatably mounted on top of the shutter speed adjusting ring 21 and has an inwardly extending radial projection 11 which engages into the groove 8. The control ring 10 is also provided with a radially outwardly extending lug 13 whose major portion is bent at a right angle with respect to the ring 10 and projects into the camera casing 1. The shutter speed adjusting ring 21 has an inwardly extending radial lug 23 projecting in the extended position of the barrel 5 into the circumferential groove 9.

A mark 24 on the control ring 10 cooperates with the shutter speed scale 22 on the shutter speed adjusting ring 21.

The inner end of the shutter casing 2 has pivotally attached thereon at 14 an auxiliary shutter blade 15 which is oscillatable in a plane parallel to the plane in which the leaves 4 of the main shutter are arranged. A spring 16 normally urges the auxiliary blade 15 into open position. In this open position a curved projection 17 of the auxiliary blade 15 is urged into engagement with one longitudinal edge of the lug 13.

The manner of operation of the device is as follows:

If it is desired to move the camera objective from its operative or extended position as illustrated in Fig. 1, into the camera or more specifically into the shutter casing, as illustrated in Fig. 5, the shutter speed adjusting ring 21 has first to be rotated until its mark B is opposite the mark 24 on the control ring 10. Thereupon the lens barrel 5 is rotated counter-clockwise (Fig. 2), and since the control ring 10 is coupled to the barrel 5 by means of the projection 11 engaging the groove 8, it will be seen that the control ring 10 will likewise be rotated. During this simultaneous rotation of barrel 5 and ring 10 the lug 13 will engage the curved projection 17 and the auxiliary shutter blade 15 will be oscillated about its pivot 14. In the position of the parts as illustrated in Fig. 3, the auxiliary shutter blade 15 has been moved in its closed position. Since the curved projection 17 in this position is coaxial with the inner face of the lug 13 a continued rotation of the barrel 5 and ring 10 will maintain the auxiliary shutter blade 15 in its closed position. However, the lug 13 will now engage the release lever 20 of the main shutter and will actuate the same so that the main shutter blades 4 are moved into open position. In this position of the parts as illustrated in Fig. 4, the barrel 5 has been rotated so far that the lug 23 of the shutter speed adjusting ring 21 has entered the lower end of the axial groove 8 and the bayonet lugs 7 have left their locking slots. It is now possible to push the barrel 5, which contains the camera objective, axially past the open shutter leaves 4 into the shutter casing 2 as illustrated in Fig. 5. It will be noted that the rear end of the lug 13 maintains the auxiliary shutter blade 15 in a closed position.

In order to move the camera objective again in operative position and make the camera ready for taking a picture, it is only necessary to pull out the barrel 5 until the lug 23 again lies in the lower end of the groove 8. Then the barrel 5 has to be rotated clockwise. This has the result that first the lugs 7 on the barrel 5 enter their bayonet slots and the lever 20 is released to permit a closing of the main shutter. Then, during continued rotation, the curved projection 17 is released so that the spring 16 becomes effective and opens the auxiliary shutter blade 15. The main shutter can now be adjusted to the desired speed and the camera otherwise be manipulated in customary manner to take a picture.

While the above embodiment of the invention employs an oscillatable blade as auxiliary shutter, it is believed to be obvious that the invention is not limited to such type of an auxiliary shutter and its arrangement. It is for instance possible to substitute for the oscillatable plate a central shutter or a slidable plate whose operation are controlled by the rotary movement of the barrel. If desired, the auxiliary shutter may be applied directly to the barrel.

What I claim is:

1. In a photographic camera, the combination with a shutter and a shutter release member, of a camera objective axially shiftable to and from operative position, said shutter being provided with leaves movable to and from a position directly behind the inner end of the camera objective when the latter is in its extended operative position, a normally open auxiliary shutter, and means operatively connected with said camera objective and actuated by the latter for first closing said normally open auxiliary shutter and then actuating said shutter release member so that the leaves of said first mentioned shutter are moved into open position preparatory to shifting said camera objective through the space occupied by said shutter leaves when closed into inoperative position.

2. In a photographic camera, the combination with a shutter and a shutter release member, of a camera objective axially shiftable to and from operative position, said shutter being arranged in a fixed plane and provided with leaves movable to and from a position where they obstruct light passing through said camera objective, a normally open auxiliary shutter, and means operatively connected with said camera objective and actuated by the latter for first closing said normally open auxiliary shutter and then actuating said shutter release member so that the leaves of said first mentioned shutter are moved into open position preparatory to shifting said camera objective through the space occupied by said shutter leaves when closed into inoperative position.

3. In a photographic camera, the combination with a shutter, a shutter speed setting member and a shutter release member, of a camera objective axially shiftable to and from operating position, said shutter being provided with leaves movable to and from a position directly behind the inner end of the camera objective when the latter is in its extended operative position, said shutter release member upon adjusting said speed setting member to a predetermined position being adapted to move and maintain said leaves into open position, a normally open auxiliary shutter, and means operatively connected with said objective and actuated by the latter for first closing said normally open auxiliary shutter and then actuating said shutter release member for opening in said predetermined position of said shutter speed setting member the leaves of said first named shutter preparatory to shifting said camera objective through the space occupied by said shutter leaves when closed into inoperative position.

4. In a photographic camera, the combination with a casing including a shutter provided with a shutter release member, of a camera objective mount axially shiftable to and from operative position, means forming a bayonet lock for securing said objective mount in operative position in said casing, said shutter being provided with leaves movable to and from a position directly behind the inner end of the camera objective mount when the latter is in its extended operative position, a normally open auxiliary shutter, and means operatively connected with said camera objective mount and actuated by the latter for first closing said normally open auxiliary shutter and then actuating said shutter release member so that the latter moves the leaves of said first mentioned shutter into open position preparatory to shifting said camera objective mount through the space occupied by said shutter leaves when closed into inoperative position.

5. In a photographic camera, the combination with a casing including a shutter provided with a shutter release member, of a camera objective mount axially shiftable to and from operative position, means forming a bayonet lock for securing said objective mount in operative position in said casing, said shutter being provided with leaves movable to and from a position directly behind the inner end of the camera objective mount when the latter is in its extended operative position, a normally open auxiliary shutter, and means operatively connected with said camera objective mount and rotated by the latter when the objective mount is rotated for opening said bayonet lock for first closing said normally open auxiliary shutter and then actuating said shutter release member so that the latter moves the leaves of said first mentioned shutter into open position preparatory to shifting said camera objective mount through the space occupied by said shutter leaves when closed into inoperative position.

6. In a photographic camera, the combination with a casing including a shutter provided with a shutter speed setting member and a shutter release member, of a camera objective mount axially shiftable to and from operative position, means forming a bayonet lock for securing said objective mount in operative position in said casing, said shutter being provided with leaves movable to and from a position directly behind the inner end of the camera objective mount when the latter is in its extended operative position, said shutter release member upon adjusting said speed setting member to a predetermined position being adapted to move and maintain said leaves into open position, a normally open auxiliary shutter, and means operatively connected with said objective mount and actuated by the same when said objective mount is rotated for opening said bayonet lock, thereby first closing said normally open auxiliary shutter and then actuating said shutter release member for opening in said predetermined position of said shutter speed setting member the leaves of said first named shutter preparatory to shifting said camera objective mount through the space occupied by said shutter leaves when closed into inoperative position.

7. In a photographic camera, the combination with a casing including a shutter provided with a shutter speed adjusting ring, of a camera objective mounting axially shiftable to and from operative position, means forming a bayonet lock for securing said objective mounting in said casing, said shutter being arranged in a fixed plane intersecting said objective mounting when the latter is in its inoperative position, said shutter including leaves movable to and from a position where they obstruct light passing through said objective mounting, a normally open auxiliary shutter, and means for closing said auxiliary shutter prior to opening the leaves of said first named shutter preparatory to shifting said objective mounting into its inoperative position, said means including an annular member concentric with said shutter speed adjusting ring, a projection on said annular member engaging an axial groove in said objective mounting, whereby said annular member is rotated with said objective mounting when the latter is actuated to open said bayonet lock, said annular member having another projection for closing first said auxiliary shutter and then opening the leaves of said first named shutter during the last mentioned actuation of said objective mounting, whereupon said objective mounting is free to be shifted into inoperative position.

8. In a photographic camera, the combination with a shutter and a shutter release member, of a camera objective axially shiftable to and from operative position, said shutter being arranged in a fixed plane and provided with leaves movable to and from a position where they obstruct light passing through said camera objective, a normally open auxiliary shutter, means operatively connected with said camera objective and actuated by the latter for first closing said normally open auxiliary shutter and then actuating said shutter release member so that the latter moves the leaves of said first mentioned shutter into open position preparatory to shifting said camera objective through the space occupied by said shutter leaves when closed into inoperative position, and means for preventing the axial shifting of said camera objective out of its extended operative position until said normally open auxiliary shutter has been closed and said first named shutter has been opened.

9. In a photographic camera, the combination with a shutter having a release lever, of a camera objective mounting axially shiftable to and from operative position, said shutter being arranged in a fixed plane intersecting said objective mounting when the latter is in its retracted inoperative position, said shutter including leaves movable to and from a position where they obstruct light passing through said objective mounting, a normally open auxiliary shutter, means coupled with said objective mounting and actuated by the same when said objective mounting is rotated for first closing said auxiliary shutter and then actuating said release lever for opening said first named shutter preparatory to shifting said objective mounting into its inoperative position, and means for preventing an axial shifting of said objective mounting out of its extended operative position until said auxiliary shutter has been closed and said first named shutter has been opened.

10. In a photographic camera, the combination with a shutter provided with a release lever and a speed adjusting ring, of a camera objective mounting axially shiftable to and from operative position, said shutter being arranged in a fixed plane intersecting said objective mounting when the latter is in its retracted inoperative position, said shutter including leaves movable to and from a position where they obstruct light passing through said objective mounting, a normally open auxiliary shutter, means including an annular member concentric with said speed adjusting ring, said annular member having a projection engaging an axial groove in said objective mounting, whereby said annular member is rotated by said projection whenever said objective mounting is rotated, said annular member having another extension adapted to close said auxiliary shutter and thereafter actuate said release lever to open said first named shutter upon rotation of said objective mounting preparatory to shifting said objective mounting into its inoperative position, and means for preventing an axial shifting of said objective mounting out of its extended operative position until said auxiliary shutter has been closed and said first mentioned shutter has been opened, said last named means comprising a lug on said speed adjusting ring normally engaging a circumferential groove in said objective mounting, said circumferential groove being connected with said axial groove, which is adapted to receive said lug when the objective mounting has been rotated into a position for axial shifting.

HUBERT NERWIN.